United States Patent [19]
Takagi et al.

[11] Patent Number: 6,115,169
[45] Date of Patent: Sep. 5, 2000

[54] SEMICONDUCTOR OPTICAL MODULATOR AND INTEGRATED OPTICAL CIRCUIT DEVICE

[75] Inventors: Kazuhisa Takagi; Syoichi Kakimoto, both of Tokyo, Japan

[73] Assignee: Mitsubishi Denki Kabushiki Kaisha, Tokyo, Japan

[21] Appl. No.: 09/104,985

[22] Filed: Jun. 26, 1998

[30] Foreign Application Priority Data

Jan. 29, 1998 [JP] Japan .................................. 10-016810

[51] Int. Cl.⁷ ............................. G02F 1/015; G02F 1/017
[52] U.S. Cl. ......................... 359/248; 359/245; 359/250; 359/251
[58] Field of Search ..................................... 359/248, 245, 359/249, 250, 251, 252; 372/26, 33

[56] References Cited

U.S. PATENT DOCUMENTS

| | | | |
|---|---|---|---|
| 5,528,413 | 6/1996 | Ishimura | 359/248 |
| 5,732,097 | 3/1998 | Yamaguchi et al. | 372/38 |
| 5,771,255 | 6/1998 | Horiuchi et al. | 372/31 |

FOREIGN PATENT DOCUMENTS

| | | |
|---|---|---|
| 3-293622 | 12/1991 | Japan . |
| 6-181366 | 6/1994 | Japan . |

*Primary Examiner*—Georgia Epps
*Assistant Examiner*—Margaret Burke
*Attorney, Agent, or Firm*—Leydig, Voit & Mayer, Ltd.

[57] ABSTRACT

A semiconductor optical modulator which, with a relatively simple configuration, eliminates phase modulation of output light from the semiconductor optical modulator by applying a voltage to a light absorption layer on the modulator. A nonlinear optical material layer changing refractive index is located in the direction of light propagation and cancels, in the output light, the phase modulation that is generated due to light intensity variations in the light absorption layer.

12 Claims, 8 Drawing Sheets

SEMICONDUCTOR OPTICAL MODULATOR AND INTEGRATED OPTICAL CIRCUIT DEVICE

BACKGROUND OF THE INVENTION

1. Field of the Invention

The present invention relates to a semiconductor optical modulator and an integrated optical circuit device used in trunk line optical communication systems. More particularly, it relates to a semiconductor optical modulator which eliminates phase modulation generated in conjunction with intensity modulation of light and an integrated optical circuit device with the semiconductor optical modulator.

2. Description of the Related Art

FIG. 6A is a perspective view of a semiconductor optical modulator of the prior art, and FIG. 6B is a cross sectional view taken along line, VIB—VIB of FIG. 6A. In the drawing, numeral 1 denotes an n-InP substrate, 2 denotes an n-InP buffer layer, 3 denotes an n-InP cladding layer, 4 denotes an n-InGaAsP separate confinement layer, 5 denotes an MQW light absorption layer comprising InGaAs well and InGaAsP barrier layers, 6 denotes a p-InGaAsP separate confinement layer, 7 denotes a first p-InP cladding layer, 8 denotes a second p-InP cladding layer, 9 denotes a p-InGaAs contact layer, 10 denotes a semi-insulating InP-embedded layer, 11 denotes a SiO$_2$ insulation film, 12 denotes a Cr/Au electrode, 13 denotes an Au plating layer, 14 denotes an AuGe/Ni/Ti/Pt/Ti/Pt/Au electrode and 15 denotes a plated Au layer.

In the semiconductor optical modulator of the electro-absorption type as described above, applying a reverse bias to the light absorption layer 5 causes the absorption spectrum of the light absorption layer 5 to shift toward longer wavelengths due to the quantum confined Stark effect. This causes a change in the absorption spectrum of the light absorption layer 5 for light of a given wavelength, thus making it possible to apply intensity modulation of light transmitted through the semiconductor optical modulator.

It is known that, as the absorption spectrum of the light absorption layer 5 is changed by varying the voltage and hence the electric field applied to a semiconductor optical modulator, refractive index of the light absorption layer 5 also changes according to the Kramers-Kronig relation.

Such a change in the refractive index causes modulation of phase, as well as intensity, of output light of the semiconductor optical modulator as indicated by the following equation (1).

$$d\phi/dt=(2\pi/\lambda)\cdot(dn/dt)\cdot L \tag{1}$$

where $\phi$ is phase of light, t is time, $\lambda$ is wavelength of light in vacuum, n is refractive index of the semiconductor optical modulator and L is length of the modulator.

FIG. 7 shows measured values of an $\alpha$ parameter which is the ratio of change in refractive index to change of absorption by the light absorption layer 5 as a function of the applied voltage. As will be clear from FIG. 7, because the $\alpha$ parameter is not always zero in the range of the applied voltage, changing the applied voltage and thereby changing the absorption spectrum of the light absorption layer 5 causes the refractive index of the light absorption layer 5 to change accordingly.

As a result, light transmitted through the light absorption layer 5 is subject not only to intensity modulation but also accompanying phase modulation which takes place in the light absorption layer 5, thus giving rise to the so-called chirping phenomenon.

While output light which has been modulated by a semiconductor optical modulator is transmitted through a transmission path which involves wavelength dispersion, such as an optical fiber, there has been a problem that propagation speed in such a transmission path differs depending on the wavelength of light, thus resulting in deterioration of the waveform of the light signal during transmission.

To counter this problem, Japanese Patent Kokai Publication No. 3-293622 discloses a configuration of semiconductor optical modulator wherein an optical waveguide region is provided along the direction of light propagation on a side wall of the semiconductor optical modulator thereby to mitigate the variation of the refractive index. With this configuration, however, it is necessary to provide the optical waveguide region on the side wall of the semiconductor optical modulator to apply a voltage to the light absorption layer, thus making the manufacturing process complicated which, together with having the difficulty of forming the optical waveguide layer with a uniform thickness, makes it difficult to apply the configuration to a mass production process.

SUMMARY OF THE INVENTION

An object of the present invention is to provide a semiconductor optical modulator which, with a relatively simple configuration, eliminates phase modulation of output light from the semiconductor optical modulator in a range of voltage applied to a light absorption layer for the purpose of intensity modulation.

The present inventors have found that phase modulation of output light from the semiconductor optical modulator can be eliminated by providing a nonlinear optical material layer which changes the refractive index thereof in the direction of light propagation, thereby canceling the phase modulation of the output light generated in accordance to the intensity variation in the light absorption layer by means of the nonlinear optical material layer. Thus, the present invention has been completed.

The present invention provides a semiconductor optical modulator provided with a light absorption layer through which light is transmitted interposed between two cladding layers thereby to modulate the intensity of the light by applying a voltage across the cladding layers and changing the absorption rate for the light being transmitted through the light absorption layer, wherein a nonlinear optical material layer is provided in the direction of light propagation for changing the refractive index thereof so as to cancel changes in the phase of the output light generated in accordance to the intensity of the intensity-modulated output light from the semiconductor optical modulator, while the thickness of the nonlinear optical material layer is set so that the changes in the phase of the output light are canceled.

With this configuration of the nonlinear optical material layer provided in the direction of light propagation so that light is transmitted through the nonlinear optical material layer, it is possible to cancel the changes in the phase of the light generated in accordance to the intensity of the intensity-modulated output light in the light absorption layer by changing the refractive index of the nonlinear optical material layer. Thus it is made possible to make the phase difference between light of high intensity and light of low intensity substantially zero.

Therefore, phase modulation of light can be eliminated and the so-called wavelength chirp can be prevented from taking place.

As a result, phase of the output light which has been intensity-modulated by the semiconductor optical modulator is made constant, and the waveform deterioration of light signals experienced in the prior art does not occur even when the light signal is transmitted through a transmission path which involves wavelength dispersion, such as an optical fiber, thereby making it possible to carry out optical communication over a long distance.

According to the present invention, there is also provided a semiconductor optical modulator wherein the nonlinear optical material layer is made of a material which changes the refractive index thereof in accordance to the intensity of intensity-modulated light and is provided at a position behind an optical output end face of the light absorption layer.

With such a semiconductor optical modulator, because the refractive index of the nonlinear optical material layer is changed in accordance to the intensity of light thereby to change the phase of light so as to cancel out the changes in the phase generated by the intensity modulation in the nonlinear optical material layer, the semiconductor optical modulator can be achieved in a relatively simple configuration and the manufacturing process can also be simplified.

According to the present invention, there is also provided a semiconductor optical modulator wherein the nonlinear optical material layer is made of a material which changes the refractive index thereof in accordance to the applied voltage, while a voltage which corresponds to the change in the phase of intensity-modulated light is applied.

The semiconductor optical modulator may also be provided with common voltage applying means which applies a voltage to both the nonlinear optical material layer and the light absorption layer in parallel.

With this configuration of applying voltage by the common voltage applying means to both the nonlinear optical material layer and the light absorption layer so that the two layers are configured in parallel to each other electrically, it is made possible to cancel out the phase difference of light generated in accordance to the voltage applied to the light absorption layer.

According to the present invention, there is also provided an integrated optical circuit device comprising the semiconductor optical modulator of claim 1 and a semiconductor laser, which emits and introduces light into the semiconductor optical modulator, being formed on a same substrate.

Such an integrated optical circuit device is capable of eliminating changes in the phase of output light from the integrated optical circuit device, thereby making it possible to obtain good transmission characteristics even when the output light is transmitted through a transmission path which involves wavelength dispersion of optical fiber.

According to the present invention, as will be clear from the above description, by providing the nonlinear optical material layer in the direction of light propagation and causing the light to pass through the nonlinear optical material layer and changing the refractive index of the nonlinear optical material layer, it is made possible to cancel out the phase modulation which has been effected in conjunction with the intensity modulation in the light absorption layer, thereby eliminating the phase modulation of the output light which has been intensity-modulated in the nonlinear optical material layer and making the phase of the light constant.

As a result, attenuation of light experienced in the prior art does not occur even when the output light which has been intensity-modulated in the semiconductor optical modulator is transmitted through a transmission path that involves wavelength dispersion such as optical fiber, thereby making it possible to carry out optical communication over a long distance.

Also because the semiconductor optical modulator of the present invention is capable of canceling out the phase modulation taking place in accordance to the light intensity without applying a voltage to the nonlinear optical material layer, the configuration of the semiconductor optical modulator is made simpler and the manufacturing process thereof is also made simpler.

Also according to the present invention, it is made possible to cancel out the phase modulation taking place in accordance to the voltage applied to the light absorption layer, by applying a voltage by means of the common voltage applying means so that the nonlinear optical material layer and the light absorption layer become electrically parallel to each other.

DESCRIPTION OF THE PREFERRED EMBODIMENTS

Embodiment 1

A semiconductor optical modulator according to the first embodiment of the present invention will now be described below with reference to FIGS. 1A and 1B.

Figure 1A:
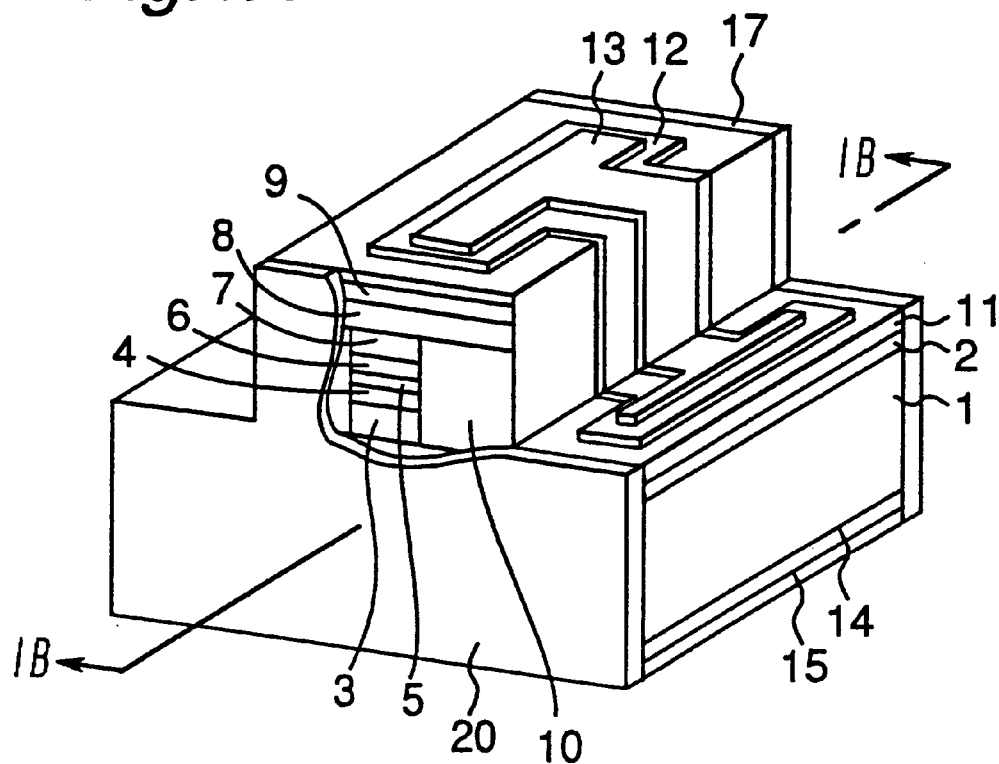
FIG. 1A is a perspective view of the semiconductor optical modulator according to the first embodiment of the present invention.
Figure 1B:
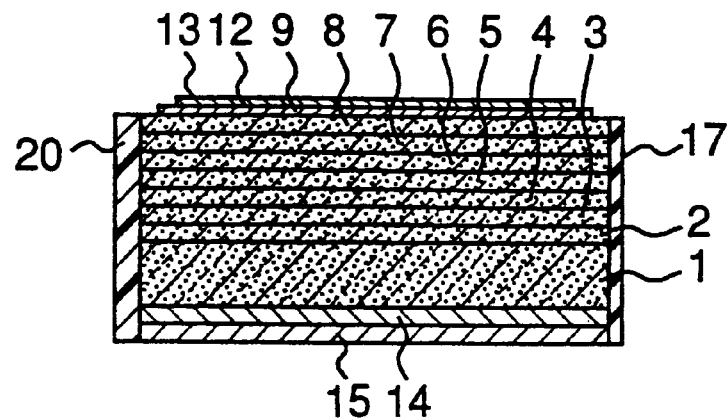
FIG. 1B is a cross sectional view along line IB—IB of FIG. 1A.
Figure 6A:
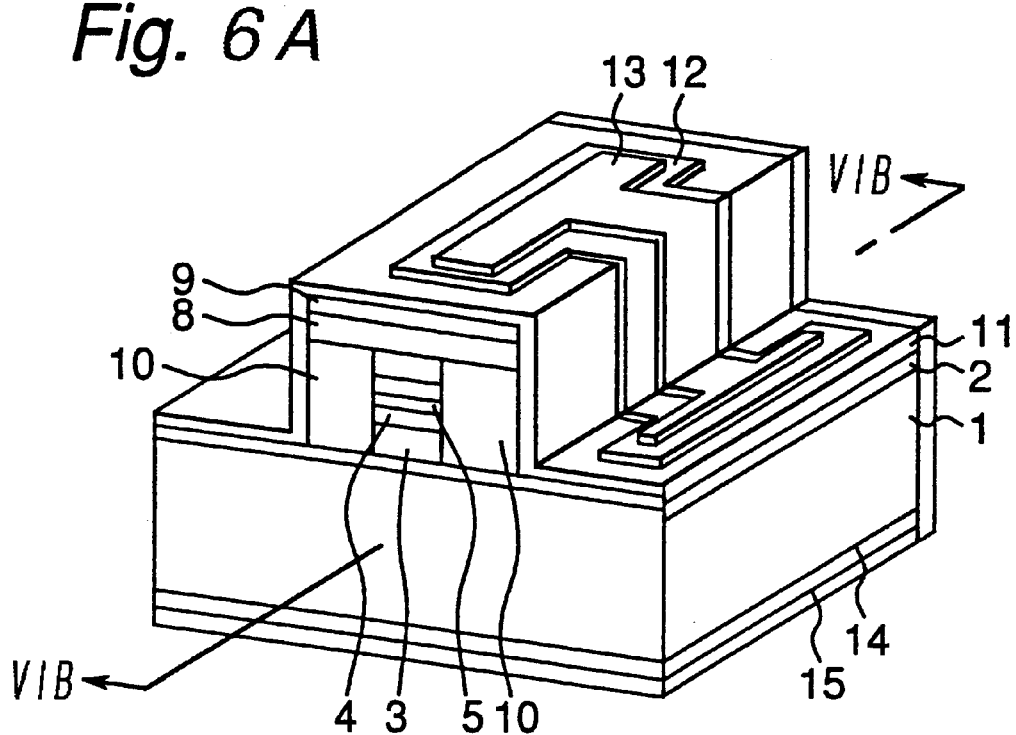
FIG. 6A is a perspective view of the semiconductor optical modulator of the prior art configuration.
Figure 6B:
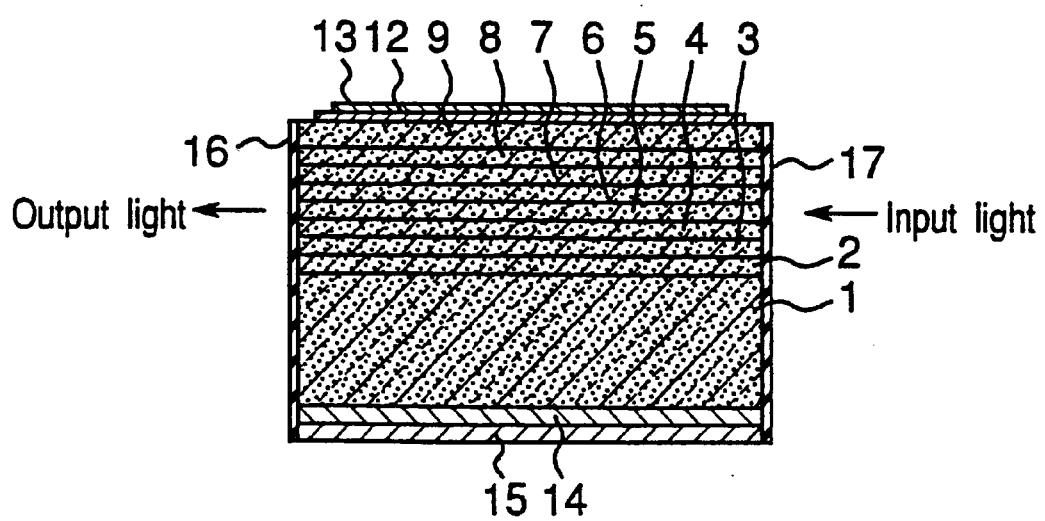
FIG. 6B is a cross sectional view along line VIA—VIA of FIG. 6A.
Figure 7:
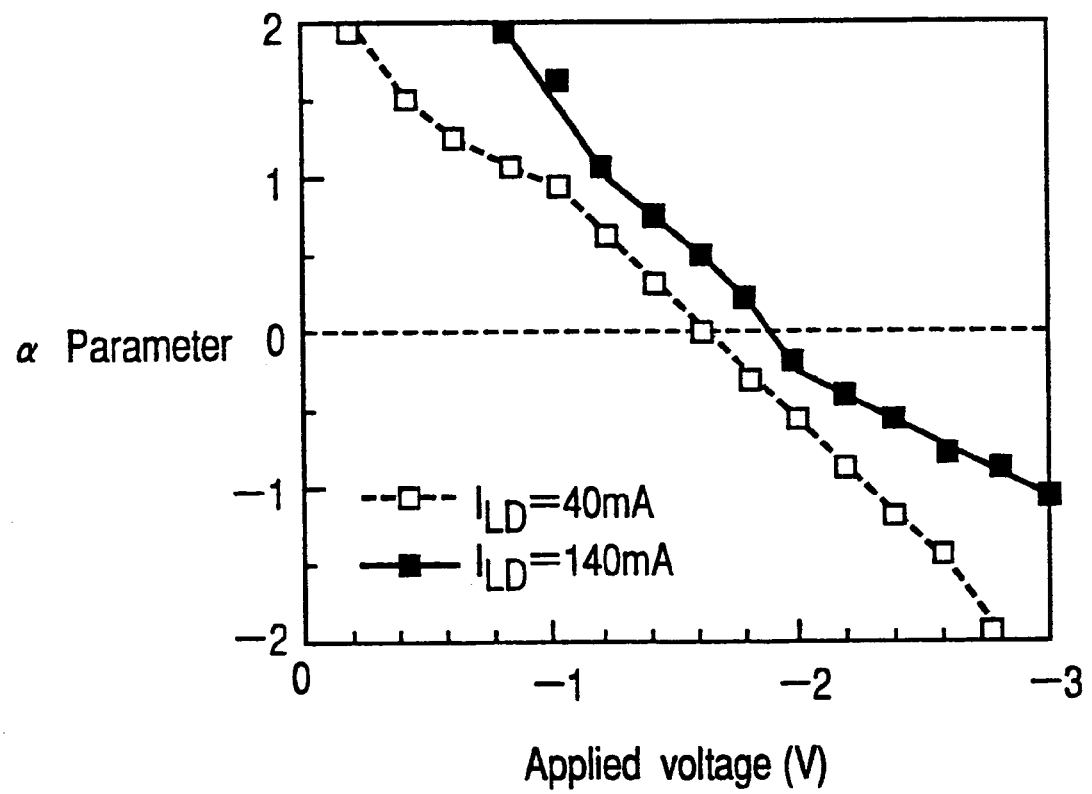
FIG. 7 shows an α parameter changing with the voltage applied to the semiconductor optical modulator of the prior art configuration.

FIG. 1A is a perspective view of the semiconductor optical modulator of this embodiment, and FIG. 1B is a cross sectional view along line IB—IB of FIG. 1A. In the drawing, same numerals as those in FIGS. 6A and 6B denote the identical or corresponding parts, while numeral 17 denotes a reflector film made of $Al_2O_3$ or the like, 20 denotes a layer made of a material having electro-optical effect, 14 denotes a back-side electrode made of AuGe/Ni/Ti/Pt/Ti/Pt/Au and 15 denotes a plated Au layer.

The semiconductor optical modulator of the electro-absorption type according to the first embodiment is provided with a nonlinear optical material layer 20, which changes refractive index in accordance with the intensity of light, located at a position on the light output side of the light absorption layer 5.

The nonlinear optical material layer 20 is preferably made of a material such as $CS_2$, 2-methyl-4-nitroaniline (MNA)

and PTS polydiacetylene, for example, which are described in "Introduction to optical electronics (Hikari-erekutoronikusu no kiso)" by A. Yariv (translated by K. Tada and T. Kamitani), pp542, Table 16-1.

Now the principle of operation will be described below.

Incident light on the semiconductor optical modulator of electric field absorption type is subject to intensity modulation by a voltage applied on the light absorption layer 5, as described above. Because α parameter of the semiconductor optical modulator is generally non-zero, refractive index of the light absorption layer 5 also changes with the applied voltage, as shown in FIG. 8, so that wavelength of light which has transmitted through the light absorption layer 5 shifts, thus phase of the output light from the semiconductor optical modulator also changes according to the light intensity.

According to the first embodiment, the phase-modulated light is transmitted through the nonlinear optical material layer 20 provided on the light output end face of the semiconductor optical modulator to make it synchronize with the intensity modulation and cancel out the phase modulation, thereby to obtain output light having a constant phase without phase modulation.

Specifically, as a voltage is applied to the light absorption layer 5 for intensity modulation, phase of the light is retarded in accordance to a change in the refractive index of the light absorption layer 5.

The light with the retarding phase is transmitted through the nonlinear optical material layer 20 thereby to advance the phase, so that the final output is light of which phase modulation has been canceled out.

Rate of phase modulation caused by the change in the refractive index of the entire semiconductor optical modulator including the nonlinear optical material layer 20 according to the first embodiment is given by the following equation (2).

$$d\phi/dt = 2\pi \cdot ((dn_{mod}/dt) \cdot L_{mod} + (dn_{n1}/dt) \cdot L_{n1})/\lambda \quad (2)$$

where $L_{mod}$ is length of the semiconductor optical modulator, $\lambda$ is wavelength, t is time, $n_{mod}$ is change in refractive index due to electric field for incident light on the modulator, $\phi$ is phase of light, $L_{n1}$ is thickness of the nonlinear optical material layer 20, and $n_{n1}$ is change in refractive index of the nonlinear optical material layer 20 due to light intensity.

In order to satisfy the condition of $d\phi/dt=0$, $dn_{mod}/dt$ and $dn_{n1}/dt$ must have opposite signs because $L_{mod}>0$ and $L_{n1}>0$. Therefore, phase modulation in the entire semiconductor optical modulator can be canceled out by selecting the light absorption layer 5 and the nonlinear optical material layer 20 in such a combination that $(dn_{mod}d/dt)(dn_{n1}/dt)<0$ is satisfied.

According to the first embodiment, output light of the semiconductor optical modulator, which has been subjected to phase modulation in accordance with the change in refractive index $n_{mod}$ for the incident light of the modulator, is transmitted through the nonlinear optical material layer 20 provided on the light output end face of the semiconductor optical modulator, thereby modulating the phase again. Thickness $L_{n1}$ of the nonlinear optical material layer 20 is set to such a value that the phase modulation of the output light is canceled out completely by the modulation which is applied again.

Thus the change in the refractive index and the thickness of the nonlinear optical material layer 20 are determined so that, when the refractive index of the light absorption layer 5 is changed and the phase of light which has been transmitted therethrough has been retarded in case intensity modulation is carried out by applying a specified voltage to the light absorption layer 5, the light is transmitted through the nonlinear optical material layer 20 to advance the phase thereof, so that phase modulation of the final output light is canceled out.

Specifically, under such conditions that the change in the refractive index $dn_{mod}$ of the semiconductor optical modulator is 0.001, length $L_{mod}$ of the semiconductor optical modulator is 200 μm, intensity of light at the light output end face of the semiconductor optical modulator is 1 mW/μm² and PTS polydiacetylene is used as the material to make the nonlinear optical material layer 20, setting the thickness d of the nonlinear optical material layer 20 to 16 nm causes the phase modulation in the light absorption layer 5 to be substantially canceled out when transmitting through the nonlinear optical material layer 20, so that phase difference corresponding to the light intensity becomes substantially zero throughout the semiconductor optical modulator, thus making it possible to obtain output light of a constant phase without phase modulation.

According to the first embodiment, as described above, phase modulation of light effected in conjunction with the intensity modulation in the light absorption layer 5 can be canceled out by providing the nonlinear optical material layer 20 having the specified thickness at the light output end face of the semiconductor optical modulator, thus making it possible to prevent the so-called chirping from taking place.

As a result, waveform deterioration of light signals experienced in the prior art does not occur even when the light signals are transmitted through a transmission path which involves wavelength dispersion such as optical fiber, thereby making it possible to carry out optical communication over a long distance.

With the semiconductor optical modulator of the first embodiment, particularly because wavelength is shifted in the nonlinear optical material layer 20, there is no need to apply a voltage to the nonlinear optical material layer 20, and the manufacturing process to be described below becomes simple.

Now a method of manufacturing the semiconductor optical modulator of the first embodiment will be described below with reference to FIGS. 2A–2G. The left-hand sides of FIGS. 2A–2G are cross sectional views taken along line IB—IB of FIG. 1A and the right-hand side are side views when viewed from the direction of light output end sides.

Figure 2A:
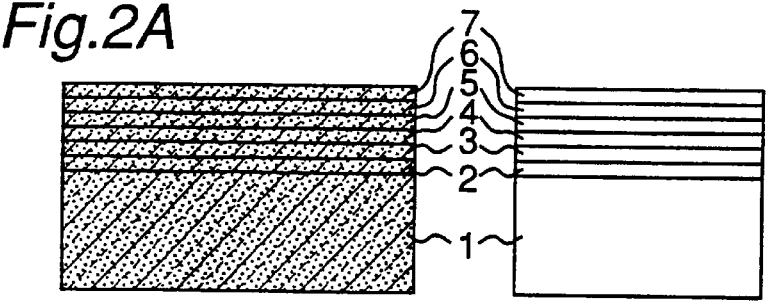
FIGS. 2A–2G illustrate a process of manufacturing a semiconductor optical modulator according to the first embodiment of the present invention.

First, as shown in FIG. 2A, the n-InP buffer layer 2, the n-InP cladding layer 3, an n-InGaAsP separate confinement layer 4, the InGaAs/InGaAsP-MQW light absorption layer 5, the p-InGaAsP separate confinement layer 6 and the p-InP cladding layer 7 are formed successively on the n-InP substrate 1 through crystal growth by MOCVD process.

Figure 2B:
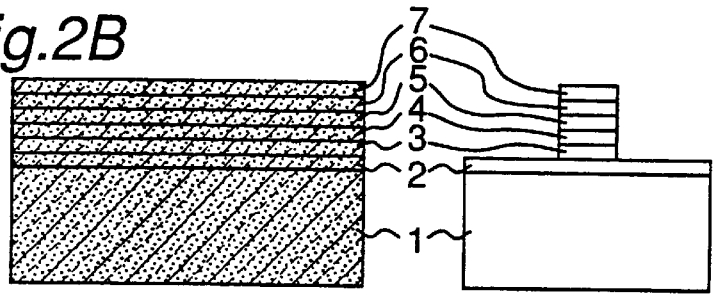

Then as shown in FIG. 2B, a mesa of stripe configuration is formed in dry etching process by using a mixed gas of CH₄ and H₂ and using SiO₂ as a mask (not shown).

Figure 2C:
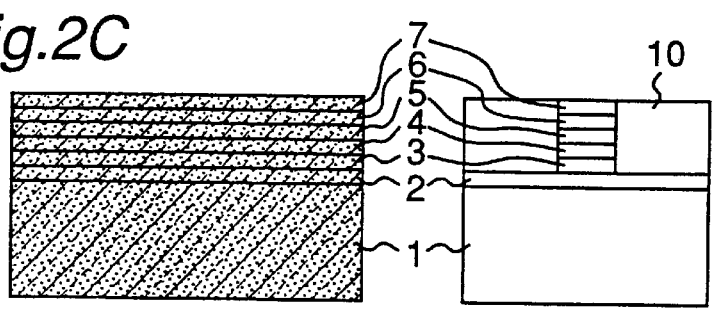

Then as shown in FIG. 2C, a semi-insulating InP is embedded in the region etched in mesa configuration by MOCVD process, thereby to form an embedded layer 10.

Figure 2D:
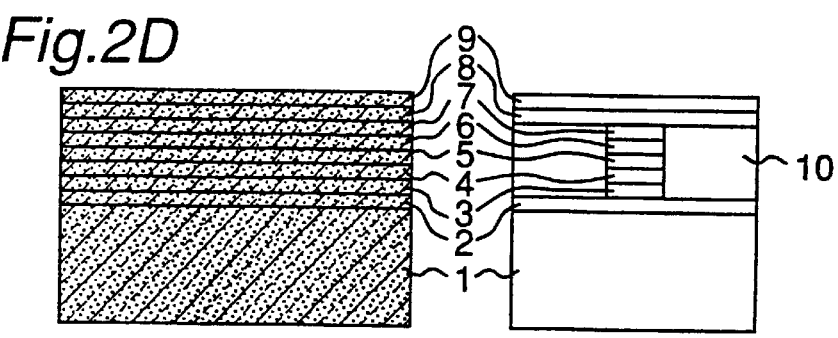

Then as shown in FIG. 2D, the SiO₂ mask (not shown) is removed and the second p-InP cladding layer 8 and the p-InGaAs contact layer 9 are successively formed over the entire surface through crystal growth by MOCVD process.

Figure 2E:
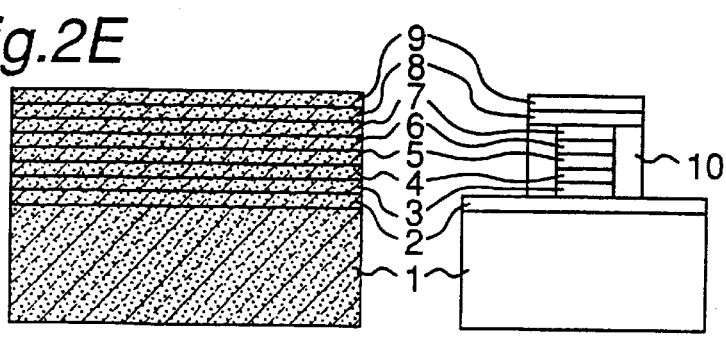

Then as shown in FIG. 2E, SiO₂ is used as a mask (not shown) to etch out the p-InGaAs contact layer 9, the second p-InP cladding layer 8 and the semi-insulating InP embedded layer 10 by using the mixed gas of CH₄ and H₂, while leaving a portion where light is to be transmitted.

Figure 2F:
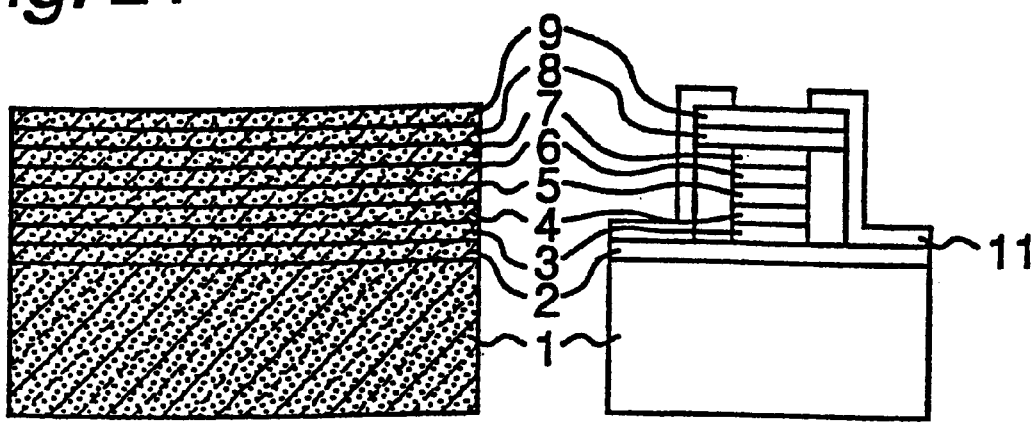

Then as shown in FIG. 2F, after forming an SiO$_2$ insulation film 11 over the entire surface, the SiO$_2$ film in a portion where an electrode is to be formed is removed in wet etching process by using buffered hydrofluoric acid.

Figure 2G:
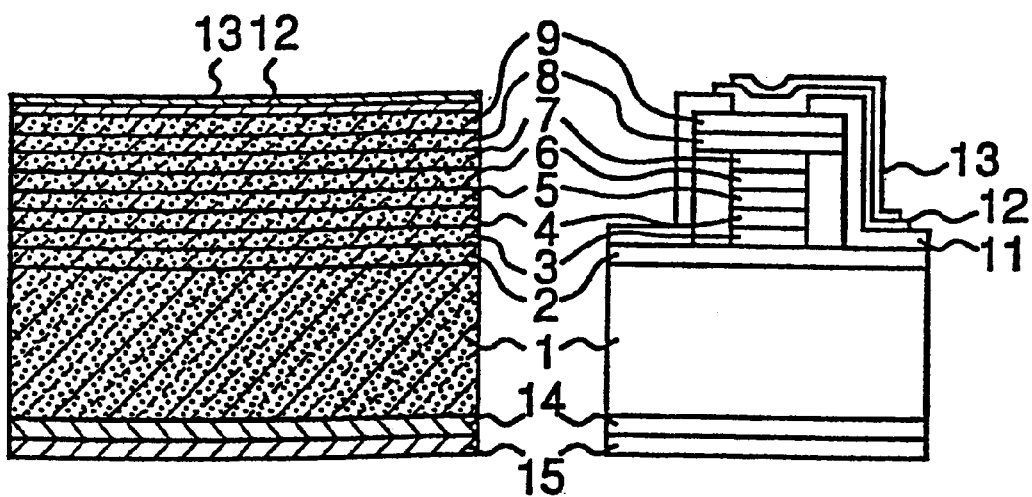

Then as shown in FIG. 2G, after forming a Ti/Au electrode 12 on the surface by sputtering or vapor deposition, a pattern of an Au plating layer 13 is formed.

The Ti/Au electrode 12 is etched in wet etching process to form an electrode pattern.

Then after forming the AuGe/Ni/Ti/Pt/Ti/Pt/Au electrode 14 on the back surface by vapor deposition, the Au plating layer 15 is formed.

Last, an anti-reflection film 17 made of such a material as Al$_2$O$_3$ is formed on the light input end face by vapor deposition, and the light output end face is coated with PTS polydiacetylene thereby to form the nonlinear optical material layer 20 having the specified thickness, thus completing the semiconductor optical modulator shown in FIG. 1A.

With the method of manufacturing the semiconductor optical modulator according to the first embodiment, as described above, the semiconductor optical modulator which eliminates the phase modulation effected in conjunction with the intensity modulation, that has been a problem in the prior art, can be obtained simply by adding a process of coating the light output end face with the nonlinear optical material layer 20 having the specified thickness.

The manufacturing process for the semiconductor optical modulator according to the first embodiment is particularly very simple in that only a step of coating the nonlinear optical material layer 20 is added to the conventional process, and can be easily applied to mass production.

Embodiment 2

A semiconductor optical modulator according to the second embodiment of the present invention will be described below with reference to FIGS. 3A–3C.

Figure 3A:
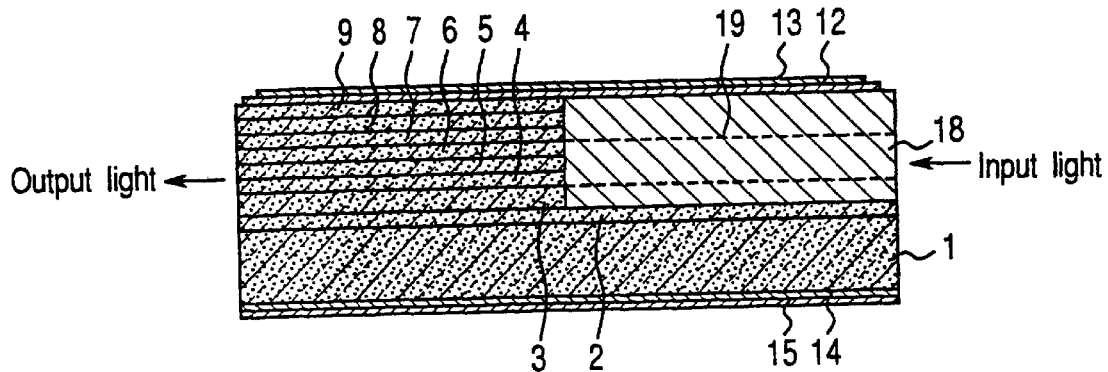
FIGS. 3A–3C are cross sectional views of the semiconductor optical modulator according to a second embodiment of the present invention.
Figure 3B:
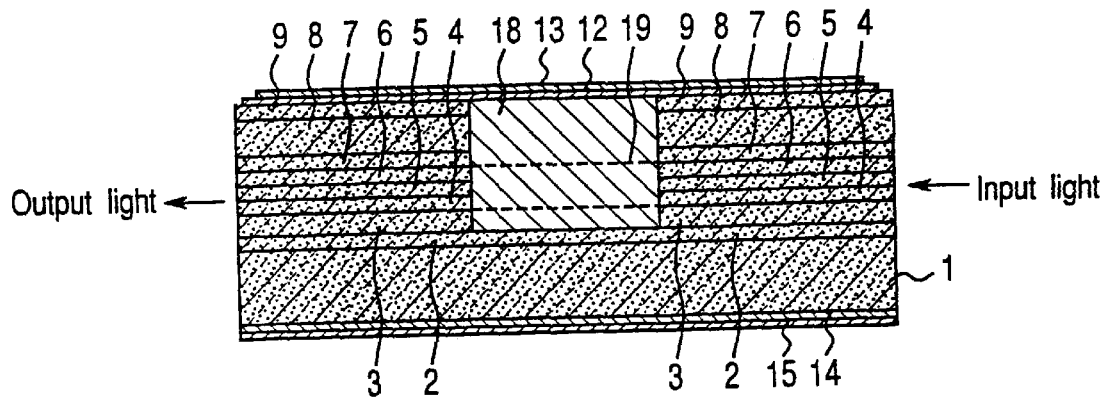
Figure 3C:
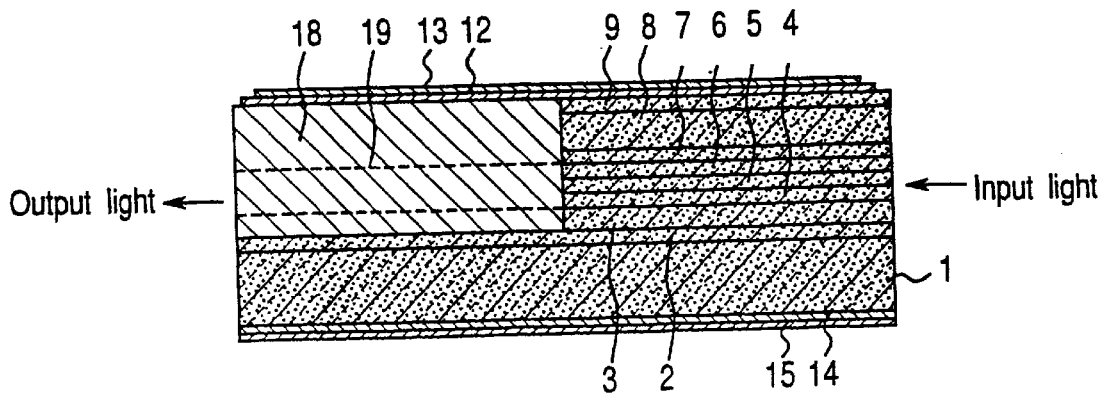

FIGS. 3A–3C are cross sectional views of a semiconductor optical modulator of this embodiment at a position corresponding to the line IB—IB of FIG. 1A. In the drawing, same numerals as those in FIG. 6 denote the identical or corresponding parts, while numeral 18 denotes a nonlinear optical material layer, and 19 denotes a core region of the nonlinear optical material layer. Light is transmitted mainly through the core region 19.

According to the second embodiment, the nonlinear optical material layer 18 is made of a material of which refractive index for light transmission is changed by an applied voltage, and phase of light is changed by applying a voltage and changing the refractive index of the nonlinear optical material layer 18.

As will be clear from FIG. 3A, while a specified voltage is applied across electrodes 12 and 14 to thereby modulate the light intensity in the light absorption layer 5, the voltage is also applied to the nonlinear optical material layer 18 at the same time.

Thus in the semiconductor optical modulator according to the second embodiment, it is necessary to determine the thickness of the nonlinear optical material layer 18 in the direction of light propagation so that, when the specified voltage is applied to the light absorption layer 5, phase modulation of light effected in the light absorption layer 5 is canceled out completely after passing the nonlinear optical material layer 18 which changes the refractive index thereof by such an amount as to cancel out the phase modulation as the specified voltage is applied thereto at the same time.

Specifically, because the voltage applied to the light absorption layer 5 for intensity modulation causes the refractive index of the light absorption layer 5 to change and accordingly the phase of the light to be retarded, the light of retarded phase is passed through the nonlinear optical material layer 18 to advance the phase, thereby having light of which phase modulation is canceled out being provided as final output.

Also with such a configuration as separate voltages are applied to the light absorption layer 5 and to the nonlinear optical material layer 18, determining the thickness of the nonlinear optical material layer 18 in the direction of light propagation and the voltage applied thereto will suffice so that the phase modulation is canceled out completely when the light which has been phase-modulated in the light absorption layer 5 is transmitted through the nonlinear optical material layer 18.

Thus the phase modulation effected in accordance to the modulated light intensity can be canceled out thereby eliminating the phase modulation of the output light from the semiconductor optical modulator, and the phase can be made constant.

As shown in FIG. 3A–3C, the nonlinear optical material layer 18 may be provided at any of (a) on the light input side of the semiconductor optical modulator, (b) amid the semiconductor optical modulator or (c) on the light output side of the semiconductor optical modulator. The nonlinear optical material layer 18 is made by removing a part of the semiconductor optical modulator from the top down to the n-InP buffer layer 2 and bonding the nonlinear optical material layer 18 therein, then forming the Ti/Au electrode 12 and the Au plating layer 13 on top thereof, while a voltage is applied in parallel with the light absorption layer 5 of the semiconductor optical modulator.

Such a configuration as voltages are applied separately to the light absorption layer 5 and the nonlinear optical material layer 18 may also be employed.

The nonlinear optical material layer 18 is preferably made of a material such as KH$_2$PO$_4$, KD$_2$PO$_4$, LiNbO$_3$, LiTaO$_3$, CdTe, GaAs, GaP, β-ZnS, ZnSe, ZnTe, Bi$_{12}$SiO$_{20}$, CdSe, α-ZnS, Pb$_{0.814}$La$_{0.214}$-(Ti$_{0.6}$Zr$_{0.4}$)O$_3$, LiIO$_3$, Ag$_3$AsS$_3$, AgGaS$_2$, CsH$_2$AsO$_4$, (NH$_4$)H$_2$PO$_4$, (NH$_4$)D$_2$PO$_4$, BaTiO$_3$, KTa$_x$Nb$_{1-x}$O$_3$, Ba$_{0.25}$Sr$_{0.75}$Nb$_2$O$_6$, α-HIO$_3$, KNbO$_3$, KIO$_3$ for example, which are described in "Introduction to optical electronics (Hikari-erekutoronikusu no kiso)" by A. Yariv (translated by K. Tada and T. Kamitani), pp306 to 308, Table 9-2.

Because the refractive index of each of these materials differs by the crystal orientation, application of the material on the semiconductor optical modulator must be done so that light is transmitted through the nonlinear optical material layer 18 in such a direction that phase modulation effected in the light absorption layer 5 is canceled out.

According to the second embodiment, as described above, a part of the semiconductor optical modulator is removed and the nonlinear optical material layer 18 having the specified thickness is provided to allow light to transmit therethrough, so that the phase modulation which is effected in conjunction with the intensity modulation in the light absorption layer 5 is canceled out, thereby making it possible to prevent the so-called chirping from taking place.

As a result, waveform deterioration of light signal experienced in the prior art does not occur even when the light signal is transmitted through a transmission path which involves wavelength dispersion such as optical fiber, thereby making it possible to carry out optical communication over a long distance.

Now a method of manufacturing the semiconductor optical modulator of the second embodiment will be described below with reference to FIGS. 4A–4D.

The right-hand sides of FIGS. 4A–4D are cross sectional views of the output end face, and the left-hand sides of FIGS. 4A–4D are cross sectional views at a position corresponding to the line IB—IB of FIG. 1A.

Figure 4:
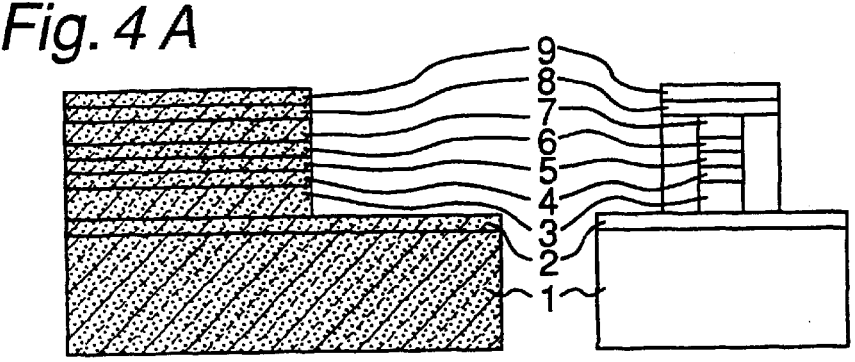
FIGS. 4A–4D illustrate a process of manufacturing a semiconductor optical modulator according to the second embodiment of the present invention.
Figure 4:
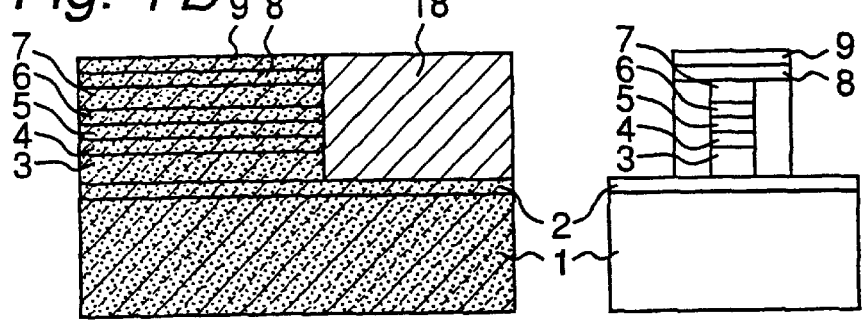
Figure 4:
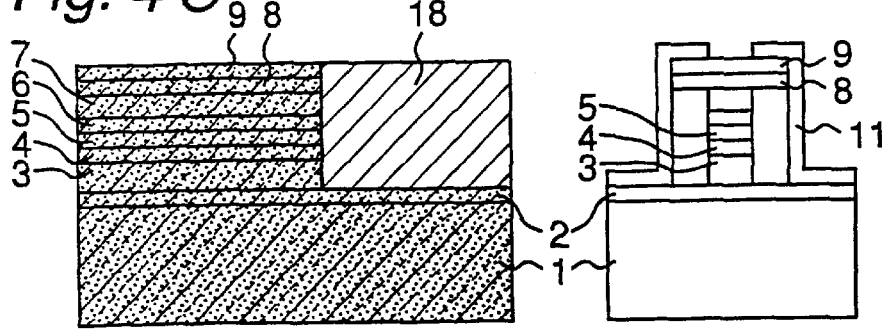
Figure 4:
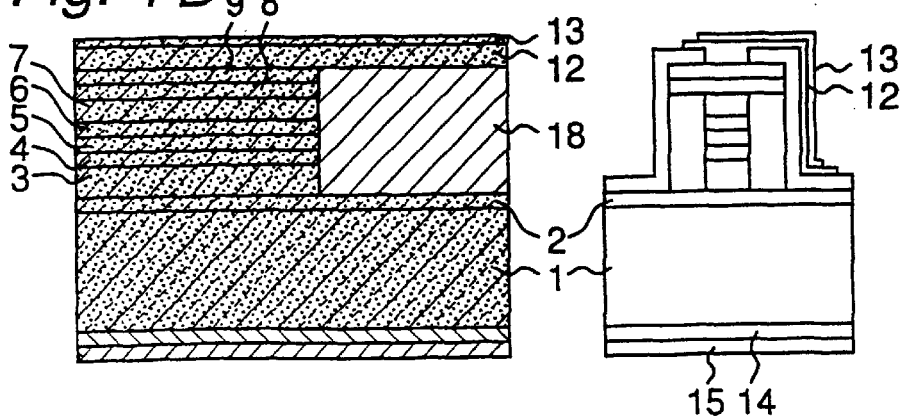

As shown in FIG. 4A, the n-InP buffer layer 2, the n-InP cladding layer 3, the n-InGaAsP separate confinement layer 4, the MQW light absorption layer 5 comprising the InGaAs well and the InGaAsP barrier, the p-InGaAsP separate confinement layer 6, the first p-InP cladding layer 7, the second p-InP cladding layer 8 and the p-InGaAs contact layer 9 are formed successively on the n-InP substrate 1 in the crystal growth process similar to that of the semiconductor optical modulator of the prior art.

Then an area where the nonlinear optical material layer 18 is to be formed is etched out from the top until the surface of the n-InP buffer layer 2 is exposed, by dry etching using a mixed gas of $CH_4$ and $H_2$.

While the process of manufacturing the configuration shown in FIG. 3A wherein the nonlinear optical material layer 18 is provided on the light input side is described as an example, configurations shown in FIG. 3B, FIG. 3C can also be manufactured similarly.

Then as shown in FIG. 4B, the nonlinear optical material layer 18 made of $LiTaO_3$, for example, is bonded with an adhesive onto the area which has been etched and remove in the previous process.

The nonlinear optical material layer 18 must be bonded so that light will be transmitted along such a crystal orientation as the phase modulation effected in the light absorption layer 5 is canceled out when passing through the nonlinear optical material layer 18.

Then as shown in FIG. 4C, after forming the $SiO_2$ film 11 over the entire surface, the $SiO_2$ film 11 on the top surface is removed by using buffered hydrofluoric acid and a contact portion of the electrode is formed.

Then as shown in FIG. 4D, after forming the Ti/Au electrode 12 on the surface by sputtering or vapor deposition, a pattern of the Au plating layer 13 is formed.

Then after etching the Ti/Au electrode 12 by wet etching and forming the electrode pattern, the AuGe/Ni/Ti/Pt/Ti/Pt/ Au electrode 14 and the Au plating layer 15 are formed successively on the back surface by vapor deposition.

The above processes complete the semiconductor optical modulator shown in FIG. 3A.

In the semiconductor optical modulator according to the second embodiment, because the electrodes 12, 13 of the semiconductor optical modulator are formed down to the nonlinear optical material layer 18, applying a voltage to the semiconductor optical modulator causes the voltage to be applied also to the nonlinear optical material layer 18 at the same time.

Thus, because the nonlinear optical material layer 18 changes the refractive index thereof with the applied voltage, it is made possible to mitigate the phase modulation effected in the light absorption layer 5 in response to the applied voltage, by using the nonlinear optical material layer 18 according to the amount of modulation.

Figure 5:
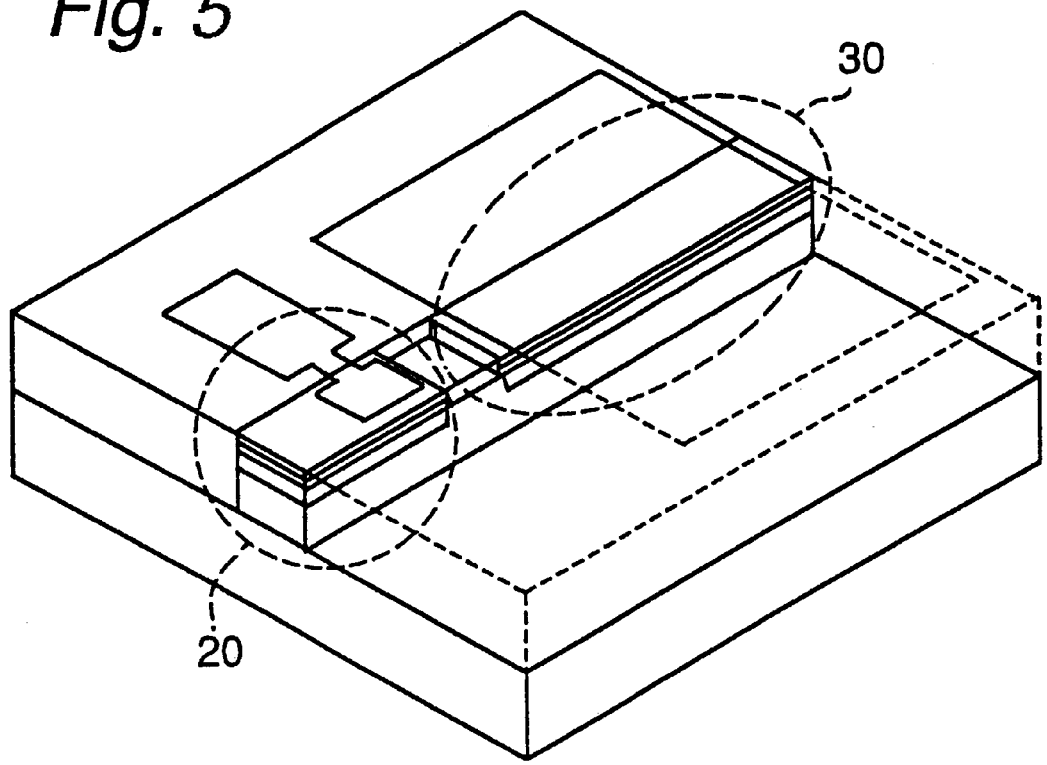
FIG. 5 is a perspective view of the integrated optical circuit device wherein the semiconductor optical modulator of the present invention and the semiconductor laser are packaged.

FIG. 5 is a perspective view of an integrated optical circuit device wherein the semiconductor optical modulator 20 according to the first or the second embodiment and the semiconductor laser 30 of the prior art configuration are formed on the same substrate.

By using the semiconductor optical modulator 20 according to the first or the second embodiment as the integrated optical circuit device as described above, it is made possible to eliminate the phase modulation of light in the entire circuit device.

The configurations of the first and the second embodiments can be applied to both an embedding type semiconductor optical modulator and a ridge type semiconductor optical modulator. A guide layer may also be provided as required between the cladding layer and the light absorption layer.

What is claimed is:

1. A semiconductor optical modulator comprising:

two semiconductor cladding layers;

a semiconductor light absorption layer through which light is transmitted, interposed between the two cladding layers, and modulating intensity of the light in response to a voltage applied across the cladding layers, changing absorption of the light being transmitted through the light absorption layer, the two cladding layers and the light absorption layer having respective substantially coplanar ends forming a facet of the semiconductor optical modulator; and a nonlinear optical material layer coating the facet, the nonlinear optical material layer changing in refractive index in response to the intensity of the light and canceling changes in phase of the light transmitted through the light absorption layer.

2. The semiconductor optical modulator as claimed in claim 1, wherein the thickness of the nonlinear optical material layer is chosen so that the changes the phase of the light is substantially zero.

3. The semiconductor optical modulator as claimed in claim 1, wherein the nonlinear optical material layer is selected from the group consisting of $CS_2$, 2-methyl-4-nitroaniline and PTS polydiacetylene.

4. A semiconductor optical modulator comprising:

two semiconductor cladding layers;

a semiconductor light absorption layer through which light is transmitted, interposed between the two cladding layers, and modulating intensity of the light in response to a voltage applied across the cladding layers, changing absorption of the light being transmitted through the light absorption layer; and a nonlinear optical material located adjacent the two cladding layers and the light absorption layer so that light passing through the light absorption layer also passes through the nonlinear optical material, the nonlinear optical material changing in refractive index in response to an applied voltage, wherein a voltage corresponding to a phase change of intensity-modulated light is applied to the nonlinear optical material and the nonlinear optical material is selected from the group consisting of $KH_2PO_4$, $KD_2PO_4$, $LiNbO_3$, and $LiTaO_3$.

5. The semiconductor optical modulator as claimed in claim 4, including separate voltage applying means for applying different voltages to the nonlinear optical material and to the light absorption layer.

6. The semiconductor optical modulator as claimed in claim 4, including common voltage applying means for applying identical voltages to the nonlinear optical material and to the light absorption layer.

7. The semiconductor optical modulator as claimed in claim 4, wherein the nonlinear optical material is located at a light input side of the semiconductor optical modulator.

8. The semiconductor optical modulator as claimed in claim 4, wherein the nonlinear optical material is located within the semiconductor optical modulator.

9. The semiconductor optical modulator as claimed in claim 4, wherein the nonlinear optical material is located at a light output side of the semiconductor optical modulator.

10. The semiconductor optical modulator as claimed in claim 4, wherein the nonlinear optical material is bonded to the two cladding layers and to the light absorption layer.

11. An integrated optical circuit device including:
a substrate;
a semiconductor optical modulator disposed on the substrate and comprising:
two semiconductor cladding layers;
a semiconductor light absorption layer through which light is transmitted, interposed between the two cladding layers, and modulating intensity of the light in response to a voltage applied across the cladding layers, changing absorption of the light being transmitted through the light absorption layer, the two cladding layers and the light absorption layer having respective substantially coplanar ends forming a facet of the semiconductor optical modulator; and
a nonlinear optical material layer coating the facet, the nonlinear optical material layer changing in refractive index in response to the intensity of the light and canceling changes in phase of the light transmitted through the light absorption layer; and
a semiconductor laser disposed on the substrate for emitting and introducing light into the semiconductor optical modulator.

12. An integrated optical circuit device including:
a substrate;
a semiconductor optical modulator disposed on the substrate and comprising
two semiconductor cladding layers;
a semiconductor light absorption layer through which light is transmitted, interposed between the two cladding layers, and modulating intensity of the light in response to a voltage applied across the cladding layers, changing absorption of the light being transmitted through the light absorption layer; and
a nonlinear optical material located adjacent the two cladding layers and the light absorption layer so that light passing through the light absorption layer also passes through the nonlinear optical material, the nonlinear optical material changing in refractive index in response to an applied voltage, wherein a voltage corresponding to a phase change of intensity-modulated light is applied to the nonlinear optical material and the nonlinear optical material is selected from the group consisting of $KH_2PO_4$, $KD_2PO_4$, $LiNbO_3$, and $LiTaO_3$; and
a semiconductor laser disposed on the substrate for emitting and introducing light into the semiconductor optical modulator.

* * * * *